E. HORTON.
GRAIN-BINDER.

No. 186,932.

4 Sheets—Sheet 1.

Patented Feb. 6, 1877.

Witnesses.
Robt F. Gaylord
M. J. Dooley

Inventor.
Emmet Horton
W. E. Simonds
Atty.

4 Sheets—Sheet 2.

E. HORTON.
GRAIN-BINDER.

No. 186,932. Patented Feb. 6, 1877.

Witnesses.
Robt F Gaylord
M. J. Dooley

Inventor.
Emmet Horton
W. E. Simonds
Atty

4 Sheets—Sheet 3.

E. HORTON.
GRAIN-BINDER.

No. 186,932. Patented Feb. 6, 1877.

Witnesses.
Robt F. Gaylord
M. J. Dooley

Inventor.
Emmet Horton
W. E. Simonds
Atty

E. HORTON.
GRAIN-BINDER.

No. 186,932. Patented Feb. 6, 1877.

Witnesses.
Robt F Gaylord
M. F. Dooley

Inventor.
Emmet Horton
W. E. Simonds
Atty.

UNITED STATES PATENT OFFICE.

EMMET HORTON, OF HARTFORD, CONNECTICUT, ASSIGNOR OF TWO-THIRDS HIS RIGHT TO AMOS WHITNEY AND JOHN JOHNSON, OF SAME PLACE.

IMPROVEMENT IN GRAIN-BINDERS.

Specification forming part of Letters Patent No. 186,932, dated February 6, 1877; application filed June 5, 1876.

*To all whom it may concern:*

Be it known that I, EMMET HORTON, of Hartford, in the county of Hartford and State of Connecticut, have invented certain new and useful Improvements pertaining to Grain-Binding Attachments for Harvesters, of which the following is a specification, reference being had to the accompanying drawings, where—

Figure 1:
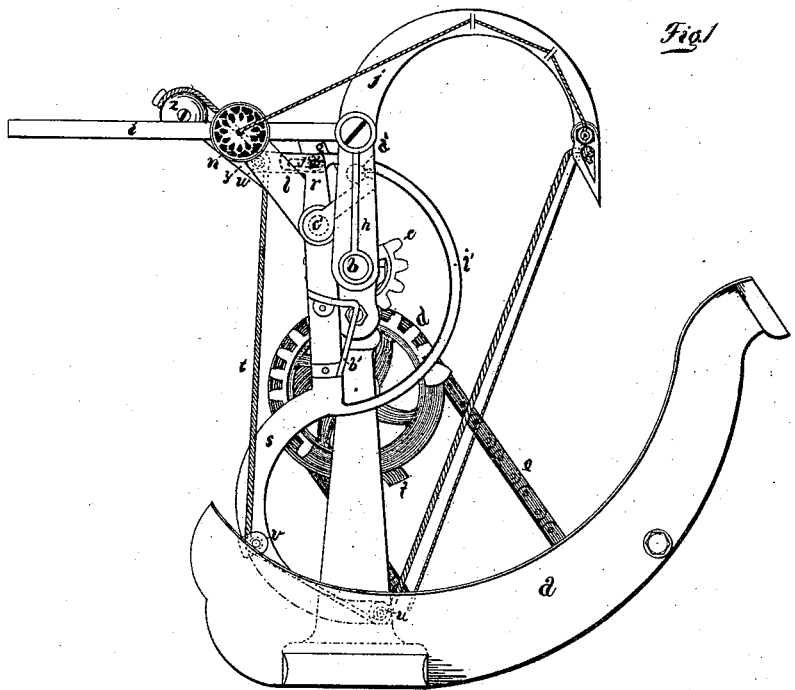
Figure 2:
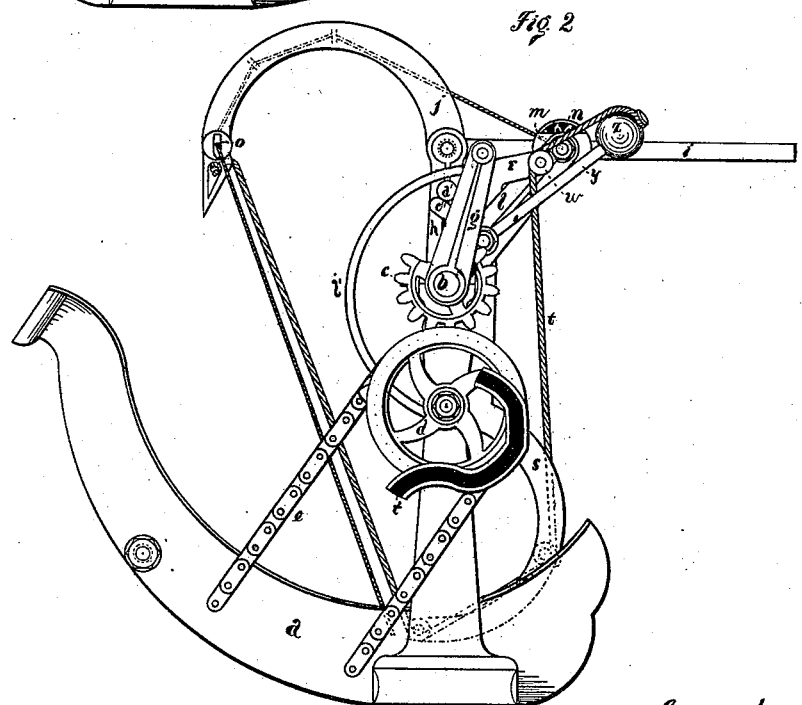
Figure 3:
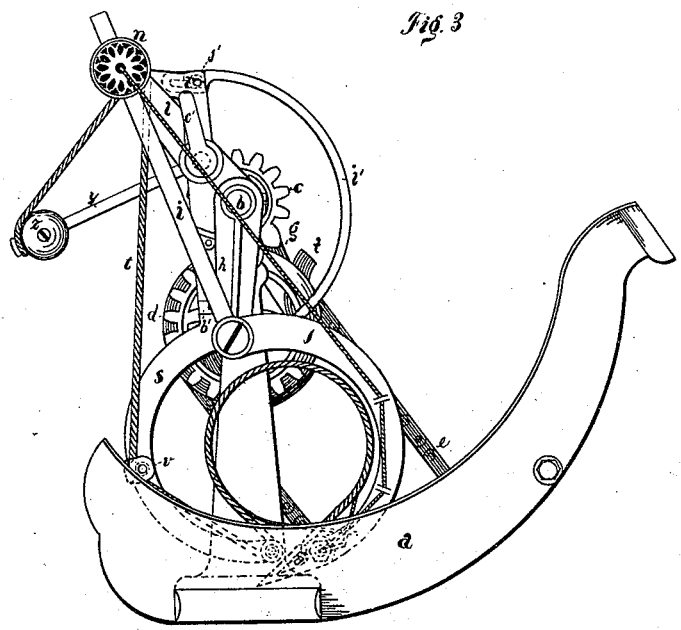
Figure 4:
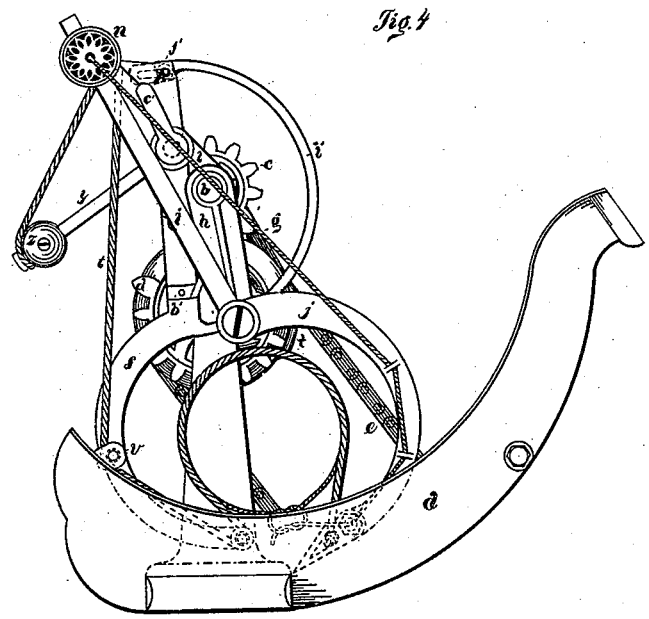
Figure 6:
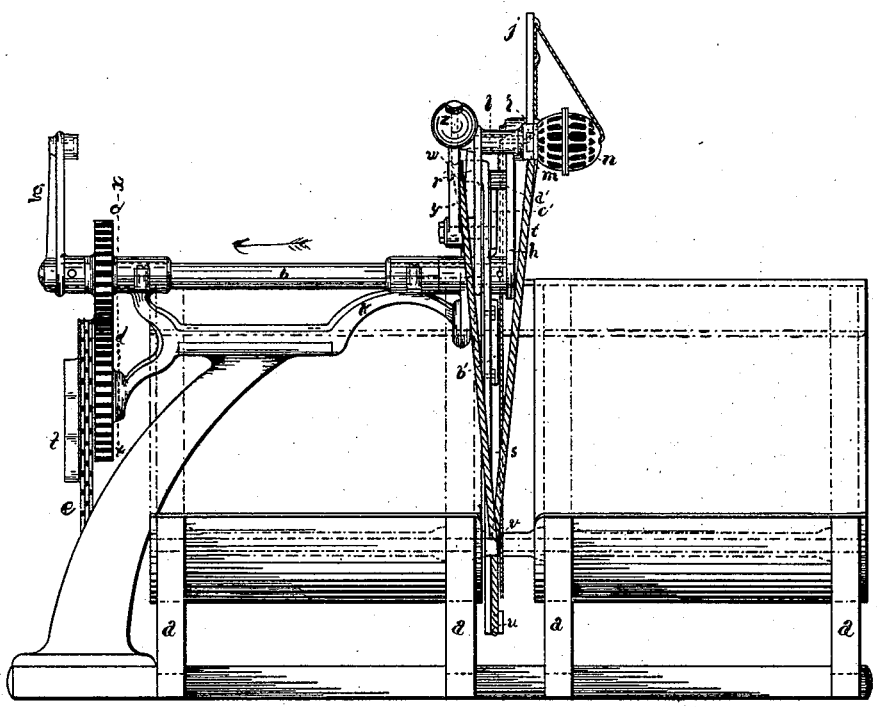
Figure 5:
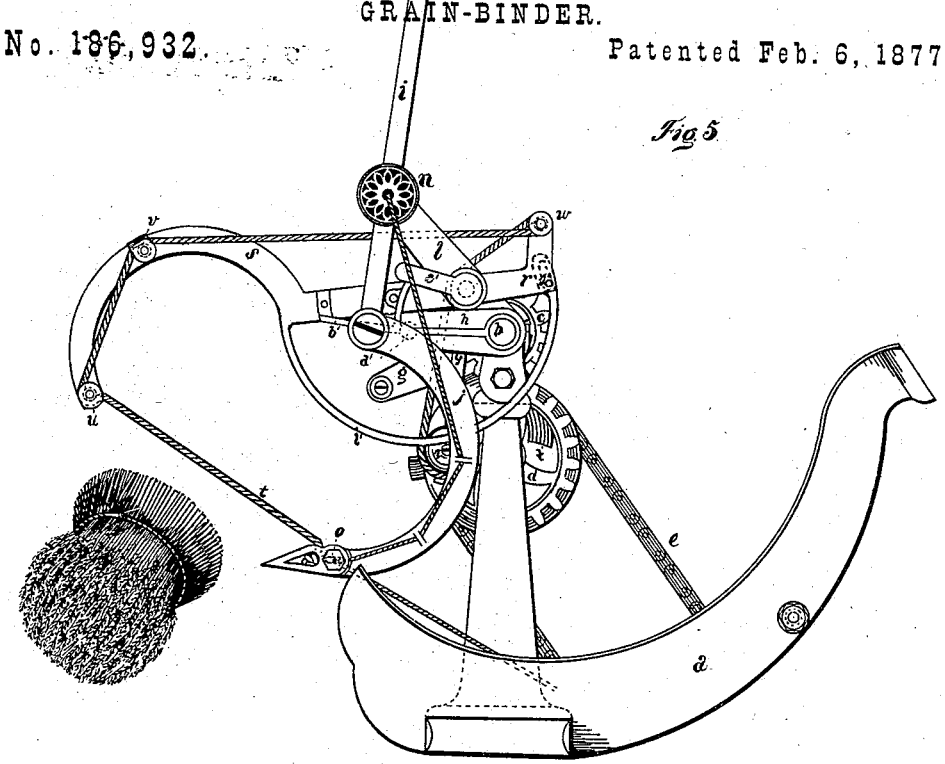
Figure 7:
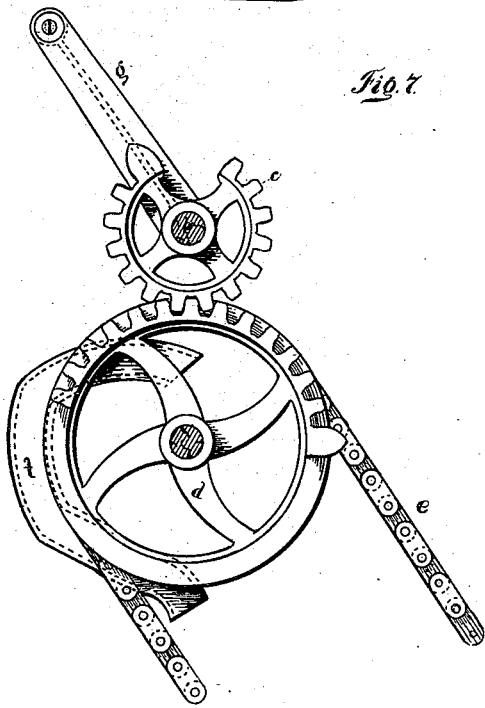

Figure 1 is a side view of the binding attachment, (as to the whole harvester a front view,) with the binder parts in the position of rest. Fig. 2 is a side view of the binding attachment, (as to the whole harvester a rear view,) with the binder parts in the position of rest. Fig. 3 is a view from the same point of observation as in Fig. 1, with the primary grasper (a term hereinafter explained) at its first rest after commencing the binding of a bundle of grain. Fig. 4 is a view of the same as Fig. 3, except that the primary grasper has retreated to its second rest from the position shown in Fig. 3. Fig. 5 is a view from the same point of observation as in Fig. 4, but the parts have advanced to the point where the binding of the bundle is finished, and said bundle is discharged upon the ground. Fig. 6 is a rear view of the binding attachment, (as to the whole harvester a side view,) with the binder parts in the same position as in Fig. 1. Fig. 7 is a view on the plane $x\,x$, Fig. 6, looking in the direction indicated by the overlying arrow, showing the operating-gear, pinion, grooved cam, and cam-arm.

The subject-matter of this invention is an improvement in method and means for causing the cord wherewith the grain is bound to encircle the bundle, and for discharging the bound bundles.

The grain is delivered upon the receiver $a$ by an endless apron, in a manner and by means which form no part of my present invention. The letter $b$ denotes the main rotary shaft of the binding attachment, bearing at one end the pinion $c$ meshed into and driven by the gear $d$, which is driven by the chain-belt $e$, actuated from another rotary shaft of the machine. The rotation of shaft $b$ is not wholly given by the pinion $c$ and gear $d$, but partially thereby, and for the remaining part by the grooved cam $f$, which is on the same shaft with the gear $d$ and cam-arm $g$, which is fast on shaft $b$.

It will be seen that a portion of the teeth of gear $d$ and pinion $c$ is cut away, though the same effect is produced if but one of these be segmental, so as to disengage at the cut-away part, and the motions of shaft $b$ are given, in the interim, by cam-arm $g$ engaging with grooved cam $f$. On one end of shaft $b$ is a rotating arm, $h$, to which is pivoted the primary grasper, composed of the bar $i$ bearing the hook $j$.

From the frame $k$ rises the standard $l$, to which is pivoted the guide-block $m$, in which slides the bar $i$, and this guide-block may be adjusted up or down on this standard as desired. To this guide-block is attached the twine-cup $n$, which holds a ball of cord wherewith to bind the bundles of grain. The twine runs out from this cup along the side of grasper-hook $j$ in proper supports, through the twine-needle $o$ down to the knot-tying device, which will not be particularly described here.

On the standard $l$ is pivoted the secondary grasper, composed of bar $r$ and hook $s$. The rope $t$, starting from the point of the primary grasper, runs around a pulley, $u$, on the point of the secondary grasper, thence around the pulleys $v$ $w$ to the swinging arm $y$, on which is a sliding weight, $z$, to adjust the tension of rope $t$, and, consequently, the tightness with which the bundles of grain shall be bound.

The operation of these parts is as follows: The parts being in the position shown in Fig. 1, the grain comes falling down on the receiver $a$ against the rope $t$. At the right time the primary grasper, actuated through the pinion $c$, moves down to the position shown in Fig. 3, throwing the rope and the cord around the bundle of grain. The graspers remain in the position shown in Fig. 3 till the knot-tying device has tied a single knot. At this point the gear $d$ and pinion $c$ are disengaged from each other, and the cam $f$ and arm $g$ have engaged. After proper rest in position shown in Fig. 3, and under the action of cam $f$ and arm $g$, the primary grasper retreats to position shown in Fig. 4, where it remains long enough to permit the knot-tying device to tie the second knot, and sever the twine.

Now, at first, under the action of cam $f$ and arm $g$, but afterward under the action of gear $d$ and pinion $c$, the parts move to position shown in Fig. 5, which discharges the bound bundle of grain upon the ground. Still continuing under the action of gear $d$ and pinion $c$, the parts move on to position shown in Fig. 1, which is the point where this description of the operation of the parts commenced.

When the parts move from the position shown in Fig. 4 to that shown in Fig. 5 the pin $a'$ on the side of arm $h$ strikes the shoulder $b'$ on the secondary grasper, and raises this grasper till the bundle is discharged, when it trips off the end of the shoulder and lets this grasper fall. This same pin immediately afterward strikes arm $c'$, which is on the same shaft with weighted arm $y$, raising it, and finally trips off the end of arm $c'$ and lets arm $y$ fall to effect tension of rope $t$.

It will be observed that gear $d$, pinion $c$, grooved cam $f$, and cam-arm $g$ are so arranged, shaped, and timed to each other that the primary grasper is first moved forward to a point where it rests a determined time, then retreats, then rests, and then goes forward to the position from which it started, the gear $d$ and grooved cam $f$ revolving constantly meanwhile. Now, I believe that the combination of a gear and pinion, either or both of which may be segmental, with a revolving cam and cam-arm, so that the pinion and gear control the movement of the operated shaft for a part of the time, and the cam and cam-arm for the other part of the time, of rotation, is broadly new.

The letter $i'$ denotes a fender, attached to the secondary grasper, to shield the working parts from the grain. It is fastened at one end to the hook $s$, which is pivoted on arm $r$, and the other end of the fender runs through the socket $j'$, or has a slot therein, through which a set-screw or bolt passes into the arm $r$, or other equivalent or suitable means for adjustment, and by sliding this fender through this socket or equivalent, as just described, the position of hook $s$ with reference to arm $r$ may be adjusted and regulated.

I claim as my invention—

1. In combination, pinion $c$ and gear $d$, either or both segmental, the grooved cam $f$ and cam-arm $g$, when designed for operation substantially as shown and described.

2. In combination, the rotary arm $h$, grasper $i\ j$, pivoted thereto, and the pivoted guide-block $m$, when arranged and designed to operate substantially as shown and described.

3. In combination, the rotary arm $h$, grasper $i\ j$, pivoted thereto, pivoted grasper $r\ s$, and the tension-rope $t$, when arranged and designed to operate substantially as shown and described.

4. In combination, the rotary arm $h$, bearing the pin $a'$, the pivoted graspers $i\ j$ and $r\ s$, rope $t$, weighted arm $y$ with its shaft, and the arm $c'$, when arranged to operate substantially as shown and described.

5. In combination, the grasper-arm $r$, hook $s$, pivoted thereto, and fender $i'$, adjustable in socket $j'$, substantially as shown and described.

EMMET HORTON.

Witnesses:
ROBT. F. GAYLORD,
WM. E. SIMONDS.